United States Patent [19]

Batt

[11] Patent Number: 4,538,320

[45] Date of Patent: Sep. 3, 1985

[54] SCRAPER WITH MITT

[76] Inventor: Thomas N. Batt, R.R. 1, Swisher, Iowa 52338

[21] Appl. No.: 605,163

[22] Filed: Apr. 30, 1984

[51] Int. Cl.³ .............................................. A47L 17/06
[52] U.S. Cl. .................................... 15/236 R; 2/160; 2/161 R; 15/105
[58] Field of Search ............ 15/105, 111, 227, 236 R, 15/247; 2/158, 160, 161 R; 294/25; 30/169

[56] References Cited

U.S. PATENT DOCUMENTS

| 1,982,431 | 11/1934 | Hines | 2/160 |
| 2,831,206 | 4/1958 | Curtis | 15/227 X |
| 2,941,214 | 6/1960 | Michael | 2/158 X |
| 3,116,502 | 1/1964 | Gerber | 15/227 X |
| 4,164,801 | 8/1979 | Thomas | 15/236 R |
| 4,281,433 | 8/1981 | Sendoykas | 15/105 |

FOREIGN PATENT DOCUMENTS

| 86187 | 8/1895 | Fed. Rep. of Germany | 15/227 |
| 2727280 | 12/1978 | Fed. Rep. of Germany | 15/227 |

Primary Examiner—Chris K. Moore
Attorney, Agent, or Firm—Robert T. Gammons

[57] ABSTRACT

A device for removing snow and ice from a vehicle windshield and windows comprising a rigid, elongate handle having at one end a beveled edge and at the other end a handgrip and a mitt disposed about the handle and secured thereto at a position to cover the handgrip.

8 Claims, 10 Drawing Figures

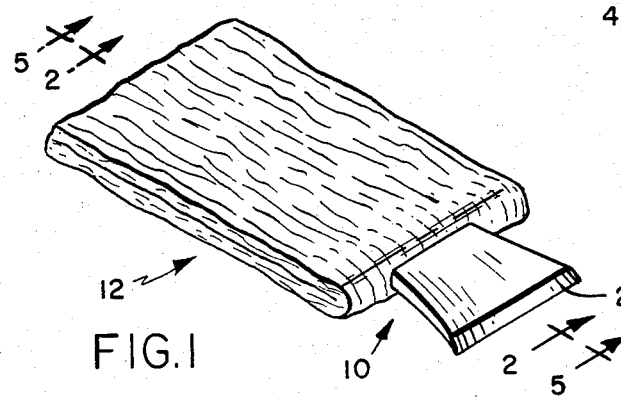
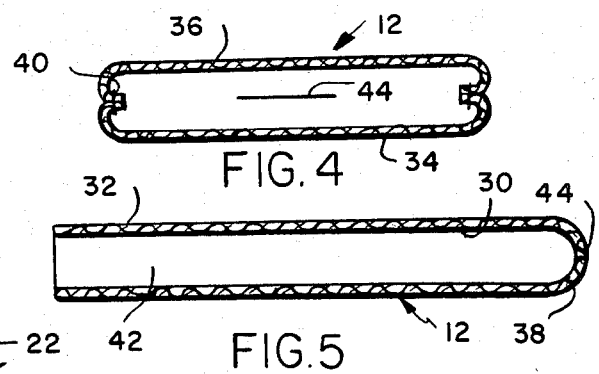
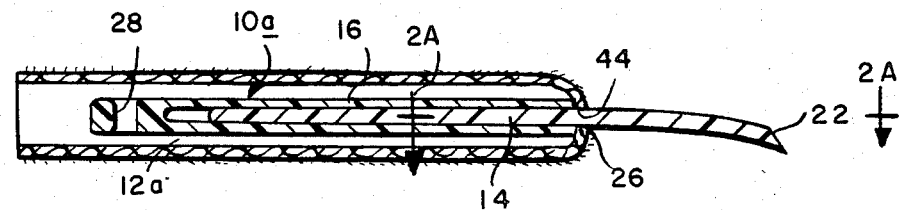
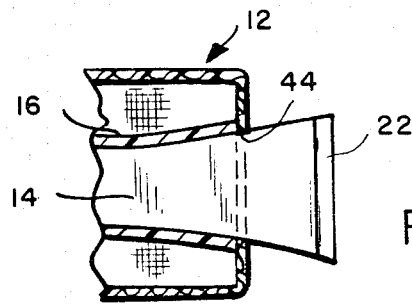
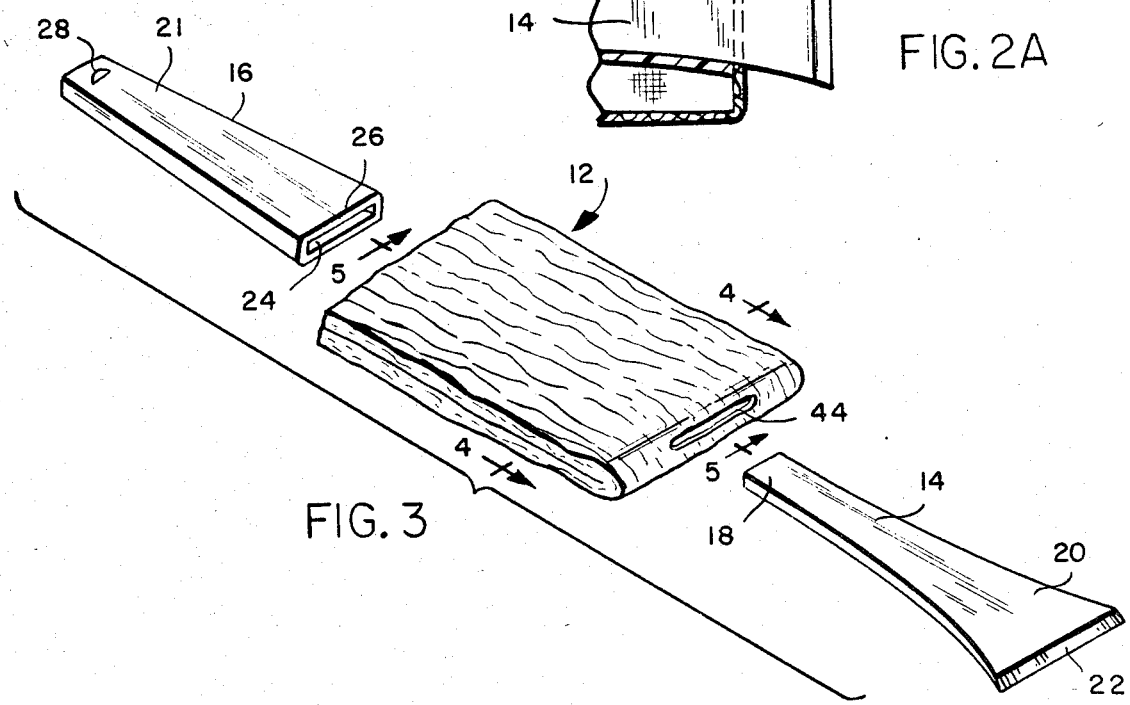

SCRAPER WITH MITT

BACKGROUND OF THE INVENTION

Mitts for protecting the hands of persons using various implements from cold and/or injury are disclosed in U.S. Pat. Nos. 1,354,241; 2,941,214; and 3,203,005. Additionally, U.S. Pat. No. 3,116,502 discloses a scraper for windshields provided with a protecting mitt. It is the purpose of this invention to provide a scraper with a protective mitt of improved construction which enables, in contrast to the aforesaid patented structure, firmly grasping the scraper to thus enable applying pressure to the blade to facilitate scraping, which provides a structure, in contrast to the aforesaid patented structure, wherein the protective mitt can be readily removed for washing, repair and/or renewal, which provides a structure, in contrast to the aforesaid patented structure, wherein the mitt is designed to receive either the right hand or the left hand, and which provides a structure wherein the mitt has an external surface textured to facilitate brushing loose ice and snow from the windshield when it is scraped free and/or a brush attached to the back side to facilitate brushing loosened snow and ice from the windshield suface.

SUMMARY OF THE INVENTION

The scraper for removing snow and ice from vehicle windshields and/or windows as herein illustrated comprises a rigid, elongate handle, a beveled blade at one end thereof, means defining a handgrip at the other end and a mitt positioned about the handle and secured thereto in a position thereon to cover the handgrip and to leave the beveled blade exposed, said mitt containing at one end an opening for receiving the handle and said handle providing means for securing the material of the mitt bounding the opening to the handle and said mitt at the other end defining an opening sufficiently large to admit a gloved or ungloved hand. The means for securing the one end of the mitt to the handle comprises telescoping parts, interengagement of which anchor the material of the mitt bounding the opening thereto. In one form, the material of the mitt bounding the opening is wedged against the outer end of one of the telescoping parts within which the other is received by interengagement of the other part with the one part. Alternatively, the material about the opening at the one end of the glove is folded over into the open end of the one part and anchored therein by interengagement of the other part within the opening in the one part. The mitt is desirably of generally rectangular configuration comprised of flexible material, smooth on one side and having a pile, felt or nap on its other side, folded with the smooth side inside to provide front and back panels integrally joined at one end and joined along two opposite sides to provide a pocket open at one end of such size as to receive the whole hand with sufficient room to grasp the grip. A pocket may be formed in the back panel of the mitt or a brush may be attached thereto. The handle may have at the grip end an aperture.

The invention will now be described with reference to the accompanying drawings, wherein:

FIG. 1 is a perspective view of the snow and ice scraper of this invention;

FIG. 2 is a section taken on the line 2—2 of FIG. 1;

FIG. 2A is a fragmentary section in a plane of the blade at the junction of the telescoping handle parts;

FIG. 3 is a perspective showing the several component parts removed from each other;

FIG. 4 is a transverse section taken on the line 4—4 of FIG. 3;

FIG. 5 is a longitudinal section taken on the line 5—5 of FIG. 3;

Figure 6:
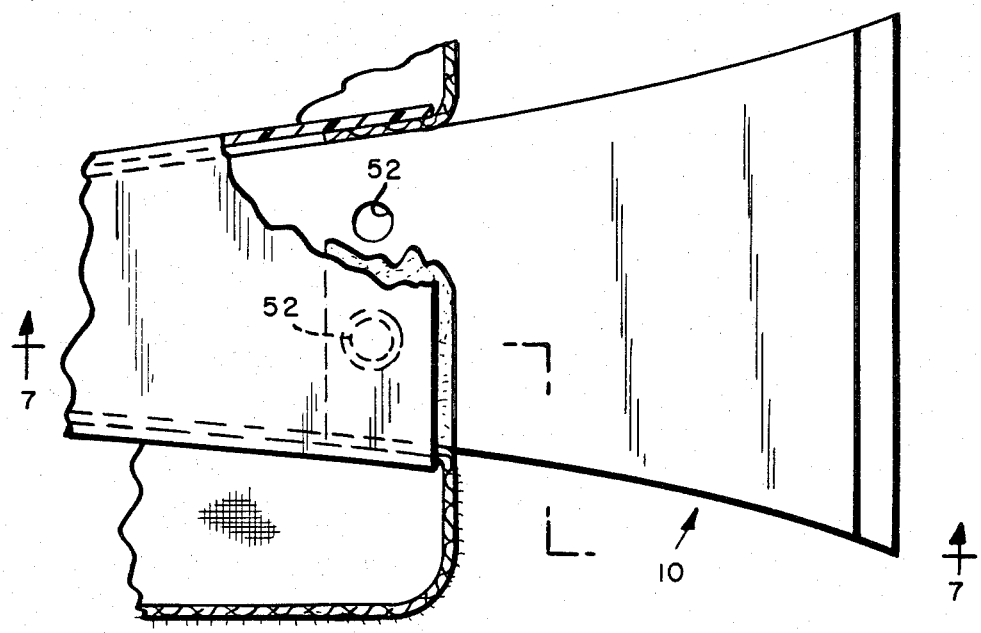
FIG. 6 is a fragmentary view of a modified structure.

Referring to the drawings, FIG. 1, the scraper for removing snow and ice from vehicle windshields as herein illustrated comprises a scraper 10 and a mitt 12 positioned about the handle of the scraper providing a pocket 12a for receiving the hand for the purpose of grasping the handle 10a of the scraper to enable manipulating the scraper and for, at the same time, protecting the hand from the cold and possible injury.

The scraper 10, as disclosed in FIGS. 2 and 3, comprises two telescoping parts 14 and 16. The part 14 is of tapering configuration, having a relatively narrow end 18 and a relatively broad end 20. At the broad end, there is a beveled edge 22 which constitutes a scraper blade. The part 16 is of tapering configuration and defines at one end a handgrip 21 and at the other end an opening 24 for telescopically receiving the end 18 of the part 14. Peripherally of the opening 24, there is a flat end surface 26. The narrow end of the part 16 contains an aperture 28.

The parts 14 and 16, when interengaged, constitute the handle 10a and are comprised of a plastic material. Desirably, the part 14 is of a relatively rigid plastic and the part 16 is of a somewhat elastic plastic so that when the two are interengaged, the part 14 will expand the part 16 sufficiently so that the elasticity of the part 16 will retain the two parts forcefully interengaged and yet will enable removing one from the other.

The mitt 12, as shown in FIGS. 4 and 5, is comprised of a flexible material such as a woven or knitted fabric having a relatively smooth inner side 30 and a nap, felt or pile outer side 32. The mitt 12 is formed from a single length of fabric folded upon itself to provide a face panel 34 and a back panel 36 integrally joined at one end 38 and unjoined at the opposite end. The opposite sides of the panels 34 and 36 are joined by stitching 40. As thus structured, the panels 34 and 36 define the pocket 12a closed at the end 38 and open at the opposite end. A narrow slit 44 is formed transversely of the closed end 38.

The length and width of the slit 44 are less than the length and width of the end face 26 of the part 16 corresponding substantially in length and width to the opening 24. As thus apertured, when the mitt is placed over the part 16 so as to bring the end face 26 into engagement with the closed end of the mitt in alignment with the slit 44 and the part 14 is thrust through the slit 44 into the opening 24, the taper of the part 14 forces the material marginally of the slit 44 into engagement with the end face 26 of the part 16, thus anchoring the mitt to the assembled parts of the scraper. As shown, the length of the mitt is such that the mitt extends beyond the apertured end of the scraper so that the hand can be entirely covered when grasping the handle of the scraper.

As thus constructed, after the scraper has been used and the mitt becomes soiled or worn, it can be readily removed by disengaging the part 14 from the part 16 for washing or replacement.

Figure 8:
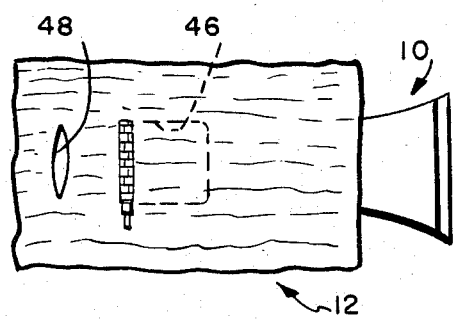
FIG. 8 is a plan view of a modified structure provided with a zipper pocket.

Optionally, as shown in FIG. 8, a zipper closed pocket 46 may be provided in the back panel of the mitt and an aperture 48 may be provided in alignment with the aperture 28 in the handle so as to enable hanging the scraper up when not in use.

Figure 9:
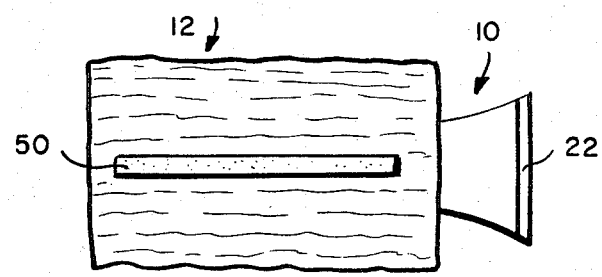
FIG. 9 is a plan view of a modifed structure provided with a brush on the back panel.

While the mitt is comprised of a material having a nap, felt or pile outer surface, it may also be desirable to attach to the back panel a brush element 50, as shown in FIG. 9, to assist in brushing away loose snow and ice after it has been scraped free of the windshield.

Figure 7:
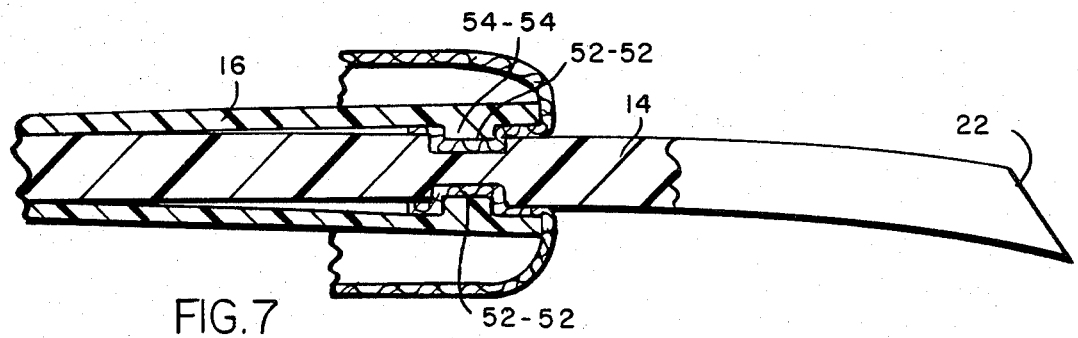
FIG. 7 is a section taken on the line 7—7 of FIG. 6.

A modified form of the scraper is shown in FIGS. 6 and 7 wherein the part 14 is provided on its opposite faces with transversely-spaced, circular recesses 52—52 and the part 16 is provided with transversely-spaced buttons 54—54 for interengagement with the recesses 52—52. In this form of the invention, the material marginally of the slit 44 is folded inwardly into the open end of the part 16 and anchored between the recesses and buttons.

Other means for fastening the mitt to the scraper may be used as, for example, snap fasteners, buttons and the like. If the device is manufactured to be a throwaway item, the mitt may be adhesively attached so that it is not removable.

While the device as herein described is made of plastic material, it is within the scope of the invention to use other materials, for example, metal for the scraper and wood for the handle or plastic.

It should be understood that the present disclosure is for the purpose of illustration only and includes all modifications or improvements which fall within the scope of the appended claims:

What is claimed is:

1. A device for removing snow and ice from a windshield, comprising a rigid two-part handle—a first part embodying an elongate handgrip, said first part having at an end opening bounded by an end face, a second part embodying a blade, said second part being structured to be inserted into the opening in the first part and a mitt positioned about the handle and secured thereto at a position thereon to cover the handgrip and to leave the beveled blade exposed, said mitt containing at one end an opening for receiving the handle, said opening at said one end of the mitt being so dimensioned that the insertion of the second part into the opening in the first part anchors the material of the mitt bounding said opening at said one end of the mitt against said end face and said mitt at the other end defining an opening sufficiently large to admit a gloved or ungloved hand for grasping the handgrip.

2. A device according to claim 1 wherein the opening in the first part is tapered and the second part is correspondingly tapered to be telescopically received within the opening in the first part and wherein the taper of the second part expands the opening at the end of the mitt into engagement with said end face.

3. A device according to claim 1 wherein the parts embody interengageable locking means structured to anchor the material marginally of the opening in the mitt within the opening at the end of the first part.

4. A device according to claim 1 wherein the handle is comprised of telescoping outer and inner parts with the blade at the end of the inner part and the handgrip at the end of the outer part and wherein the material about the opening at the one end of the mitt is folded over the end and into the outer part between the telescoping portions of the inner and outer parts.

5. A device according to claim 1 wherein the mitt has front and back sides and a pocket at the back side.

6. A device for removing snow and ice from a windshield comprising a rigid, elongate handle, means defining a scraper blade at one end, means defining a hand grip at the other end, a mitt positioned about the handle to cover the hand grip and to leave the scraper exposed, said mitt containing at one end an opening for receiving the handle and at the other end an opening for receiving the hand, a shoulder on the handle within the mitt adjacent the one end of larger size than the opening therein and means forwardly of the shoulder externally of said end for holding the marginal edge of the mitt bounding the opening engaged with the shoulder.

7. A device according to claim 6 wherein said last means comprises diverging edge portions of the handle forwardly of the shoulder.

8. A device according to claim 7 wherein the handle comprises two parts, a hand grip and a blade, wherein the hand grip contains an opening and the blade has a tapered shank telescopically fitted into said opening and wherein the end of the grip bounding the opening constitutes the shoulder and the tapered shank the means for holding the marginal edge of the mitt engaged with the shoulder.

* * * * *